(No Model.) 2 Sheets—Sheet 1.

J. S. BOWEN & E. J. POTTER.
Fruit and Vegetable Evaporator.

No. 241,840. Patented May 24, 1881.

Attest.
R. E. White
Jacob Specker

Inventors.
John S. Bowen,
Elisha J. Potter,
by R. F. Osgood, atty.

(No Model.) 2 Sheets—Sheet 2.

J. S. BOWEN & E. J. POTTER.
Fruit and Vegetable Evaporator.

No. 241,840. Patented May 24, 1881.

Attest.
R. E. White
Jacob Spahn

Inventors.
John S. Bowen,
Elisha J. Potter,
per R. H. Osgood,
Atty.

UNITED STATES PATENT OFFICE.

JOHN S. BOWEN, OF SPENCERPORT, AND ELISHA J. POTTER, OF KNOWLESVILLE, NEW YORK; SAID BOWEN ASSIGNOR, BY MESNE ASSIGNMENT, TO EUNICE J. BOWEN, OF SPENCERPORT, NEW YORK.

FRUIT AND VEGETABLE EVAPORATOR.

SPECIFICATION forming part of Letters Patent No. 241,840, dated May 24, 1881.

Application filed January 26, 1881. (No model.) Patented in Canada October 20, 1880.

*To all whom it may concern:*

Be it known that we, JOHN S. BOWEN, of Spencerport, Monroe county, New York, and ELISHA J. POTTER, of Knowlesville, Orleans county, same State, have invented a certain new and useful Improvement in Fruit and Vegetable Evaporators; and we do hereby declare that the following is a full, clear, and exact description of the same, reference being had to the accompanying drawings, in which—

Figure 1:
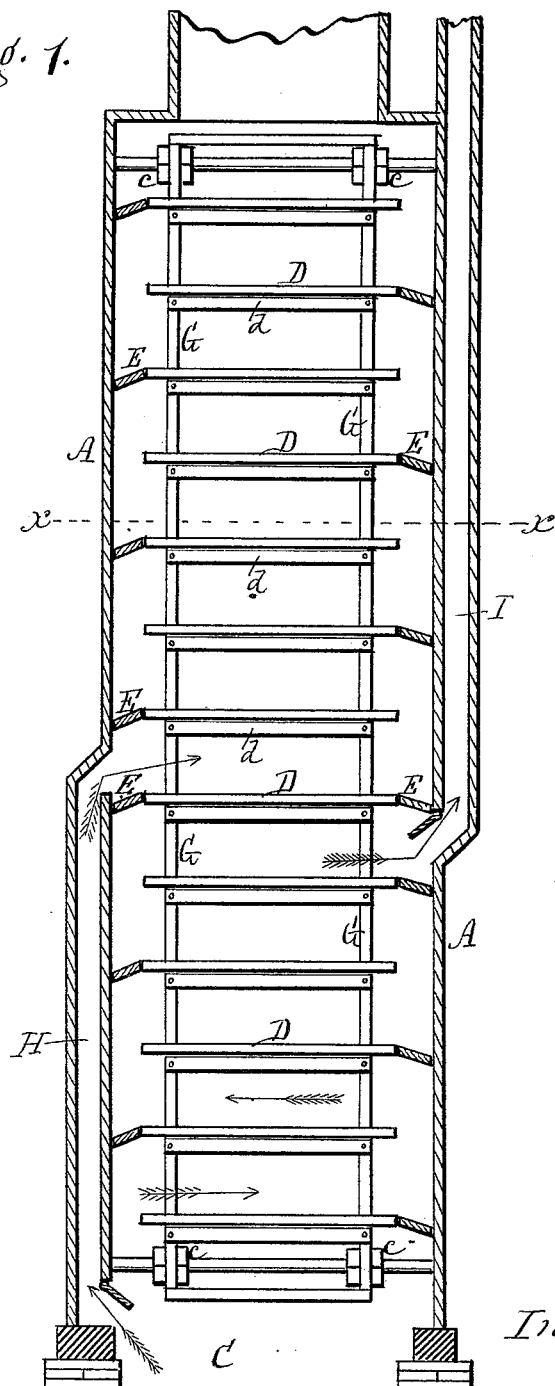
Figure 2:
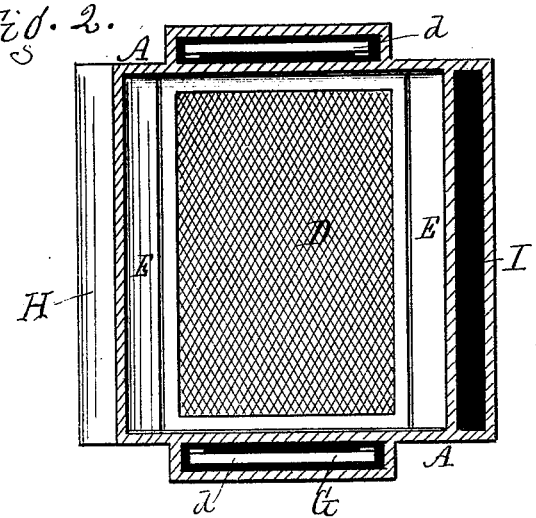
Figure 3:
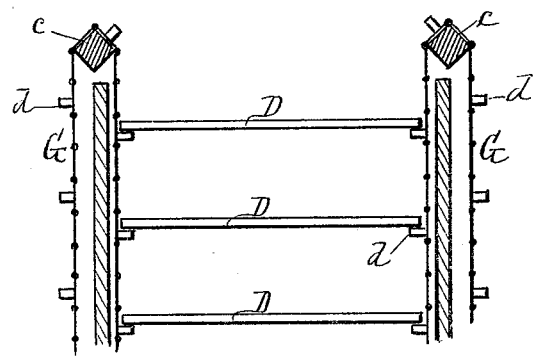

Figure 1 is a central vertical section of the apparatus. Fig. 2 is a cross-section of the same in line $x\ x$. Fig. 3 is a diagram showing the arrangement of the endless chains or belts for elevating the trays.

Our improvement relates to fruit and vegetable evaporators in which the trays are elevated through a tower by means of endless chains or belts.

The invention consists in the construction and arrangement hereinafter described.

In the drawings, A indicates the chamber or tower in which the fruit is dried, the same being of considerable height, at the top of which is a chimney, and at the bottom of which is a heating-chamber, C, as usual.

D D D are a series of trays or screens for holding the fruit, the same being inserted through a door at the bottom and removed through a door at the top. G G are two endless chains on opposite sides, consisting of sections hinged or jointed together, similarly to the sections of strap-hinges. At top and bottom the chains run around square-sided pulleys $c\ c$, attached to shafts, one shaft receiving motion by suitable gearing. To the chains are attached cross slats or cleats $d\ d$, extending across from one to the other and resting under the trays. As the chains are turned the trays will be raised. The back length of the chains runs in boxes or passages exterior to the main chamber.

E E are a series of inclined boards on the two sides of the chamber at right angles to the chains. They alternate on opposite sides and connect with every other tray, by which means a zigzag course is given to the air which passes through the chamber. The boards E E are loose, but rest on suitable ledges or supports, so that as the trays are elevated they will strike the under inclined edges and lift the boards, which latter will then fall to place. By this means a close joint is made, and no difficulty is experienced in raising the trays, whereas when the boards are fast and rest horizontally the trays must be fitted and held exactly in line, and a considerable joint must be left, which allows escape of the air.

H and I are two trunks or passage-ways on two opposite sides of the tower and outside the drying-chamber. The one, H, extends up from the heating-chamber C and opens into the chamber A about midway of its height, and the other one, I, opens from the chamber on the opposite side, and extends up to the top of the tower, where it has a free discharge. The openings of the two trunks are nearly opposite each other, but the one H opens above the tray and the one I below it, as shown in Fig. 1. The trunk I takes the damp air, saturated with moisture, from the center of the chamber, allowing it a free escape without passing through the upper trays, while the trunk H supplies dry hot air to the upper part of the chamber, which otherwise would be exhausted by being drawn through I.

By the means above described a rapid removal of the damp air is effected without its passing through the whole stack, and dry air is supplied in necessary amount to fill the upper part of the chamber. Valves are used at the bottoms of the trunks to control the currents of air. The boards E E opposite the openings of the air-trunks divide the currents of dry and damp air, one passing above and the other below the boards.

Having thus described our invention, what we claim as new, and desire to secure by Letters Patent, is—

1. The combination, with the air-trunks H I, opening into the chamber A, of the boards E E, serving, together with the tray that fits between them, to divide the currents of the dry and damp air, the dry air passing above the tray and the damp air escaping from beneath it, as herein shown and described.

2. In a fruit-drier, the combination, with the trays D D, of the inclined boards E E at the edges of the trays, fitted loosely in place, as and for the purpose specified.

In witness whereof we have hereunto signed our names in the presence of two subscribing witnesses.

JOHN S. BOWEN.
E. J. POTTER.

Witnesses:
R. F. OSGOOD,
JACOB SPAHN.